UNITED STATES PATENT OFFICE.

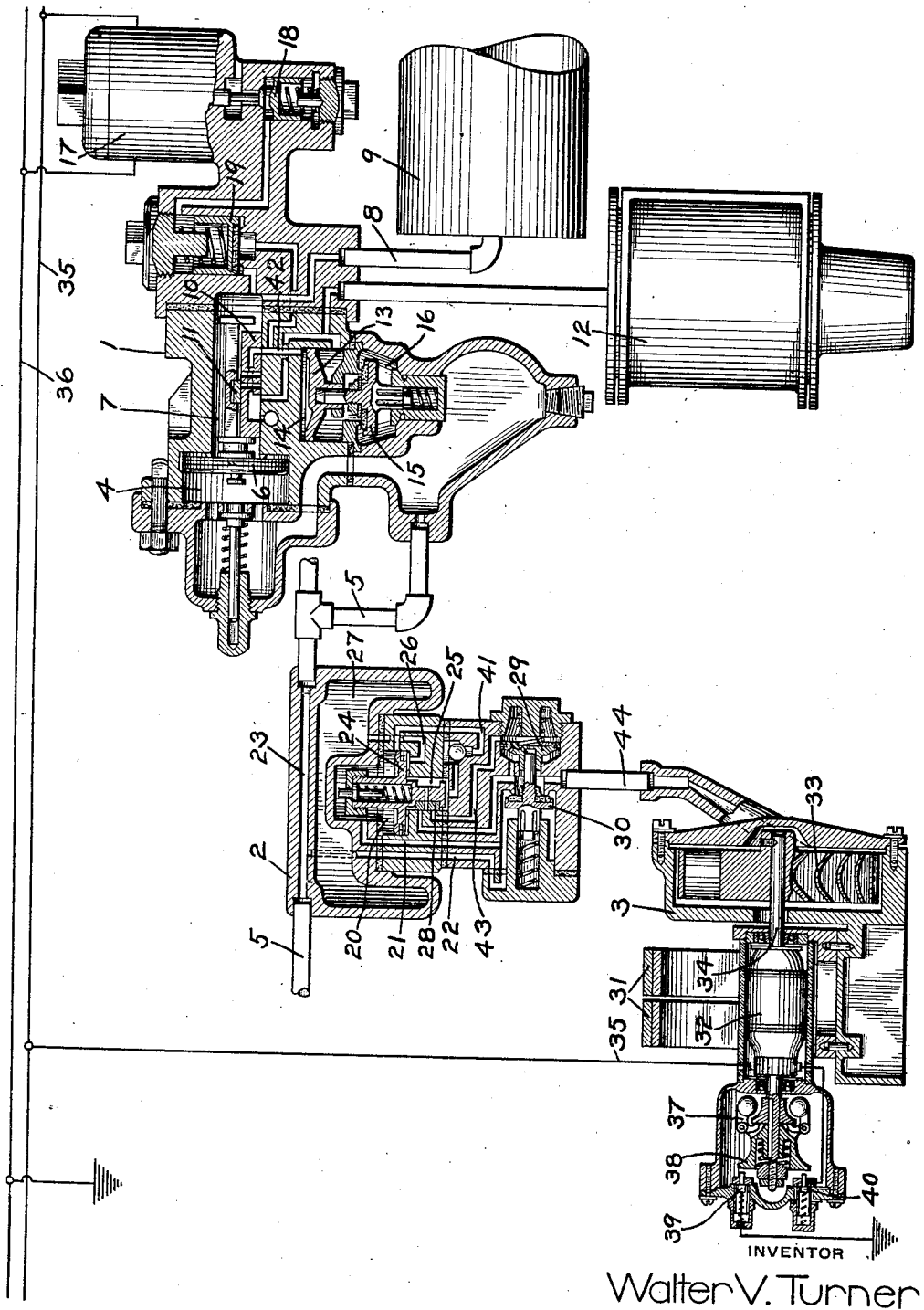

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC BRAKE.

1,313,030.   Specification of Letters Patent.   Patented Aug. 12, 1919.

Application filed October 8, 1918. Serial No. 257,320.

*To all whom it may concern:*

Be it known that I, WALTER V. TURNER, a citizen of the United States, residing at Wilkinsburg, in the county of Allegheny and State of Pennsylvania, have invented new and useful Improvements in Electropneumatic Brakes, of which the following is a specification.

This invention relates to electro-pneumatic brakes, and more particularly to the type covered by my prior application, Serial No. 191,388, filed September 14, 1917.

According to the construction shown in my prior application, a magneto-generator is provided, which is actuated by fluid from the auxiliary reservoir in an emergency application of the brakes, for generating electric current, and current thus generated is employed for propagating the emergency braking impulse through the train at a more rapid rate than is possible with a brake equipment depending entirely upon fluid pressure for the transmission of braking action.

The principal object of my present invention is to provide an improved electro-pneumatic brake of the above type.

In the accompanying drawing, the single figure is a view, mainly in section, of an electro-pneumatic brake equipment embodying my invention.

As shown in the drawing, the equipment may comprise a triple valve device 1, a vent valve device 2, and a turbo-magneto-generator 3.

The triple valve device 1 may comprise a casing having the usual piston chamber 4, connected to brake pipe 5, and containing piston 6, and having a valve chamber 7, connected by pipe 8 to auxiliary reservoir 9 and containing a main slide valve 10 and an auxiliary slide valve 11, adapted to be operated by piston 6, for controlling the admission and release of fluid under pressure to and from a brake cylinder 12.

The triple valve device also includes a quick action valve mechanism comprising a piston 13 contained in piston chamber 14 and a vent valve 15, contained in valve chamber 16 and adapted to be operated by piston 13 for venting fluid from the brake pipe 5 to brake cylinder 12.

For operating the quick action valve mechanism electrically, a magnet 17 is provided, which controls a pilot valve 18, for venting fluid from one side of a relay valve 19. The relay valve being thus operated to supply fluid from the auxiliary reservoir 9 to the piston chamber 14 of the quick action valve mechanism.

The vent valve device 2 may comprise a casing, having a piston chamber 20, connected by passages 21 and 22 with brake pipe passage 23, forming part of brake pipe 5, and containing piston 24, and having a valve chamber 25, connected by passage 26 to a chamber 27 and containing a slide valve 28 adapted to be operated by piston 24.

The movement of valve 28 by the piston 24 controls the operation of a piston 29 and a vent valve 30 for venting fluid from the brake pipe 5.

The turbo-magneto-generator 3 may comprise permanent magnets 31, having a rotary armature 32 adapted to be rotated by a turbine wheel 33 secured to an extended portion of the armature shaft 34, the turbine wheel being operated by fluid supplied upon the opening of vent valve 30 to vent fluid from the brake pipe.

Current generated by the magneto-generator is supplied through a circuit wire 35 to the magnet 17 on each car of the train, the other terminal of the magnet being connected to a grounded circuit wire 36.

For a purpose to be hereinafter explained, the generator circuit is normally held open and is adapted to be closed by the operation of a centrifugal device 37, which is adapted, when the speed of the armature 32 attains a predetermined degree, to shift a contact member 38, so as to connect contacts 39 and 40 and thereby close the generator circuit.

In operation, the brake pipe being charged with fluid under pressure, fluid flows to the triple valve piston chamber 4 and thence through the usual feed groove to valve chamber 7, charging the auxiliary reservoir 9.

Fluid also flows from the brake pipe through passages 22 and 21 to piston chamber 20 of the vent valve device 2, and thence through passage 41 to valve chamber 25. From valve chamber 25, fluid flows through passage 26 to chamber 27.

Upon a sudden reduction in brake pipe pressure, the triple valve piston 6 is shifted to emergency position in the usual manner, and fluid is supplied from valve chamber 7 through passage 42 to piston chamber 14. The quick action piston 13 is then operated to open vent valve 15 and vent fluid from the brake pipe to the brake cylinder.

The sudden reduction in brake pipe pressure, acting in piston chamber 20 of the vent valve device 2, causes the fluid pressure in valve chamber 25 to shift the piston 24, so that valve 28 uncovers a passage 43 leading to piston 29. Fluid under pressure is then supplied from valve chamber 25 to the piston 29, operating the same to open the valve 30. Fluid from the brake pipe 5 is thereupon vented through passage 22 to pipe 44 and causes the rotation of the turbine wheel 33 and the armature 32.

When the rotative speed of the armature 32 has increased to a predetermined degree, the centrifugal governor 37 operates the contact member 38 so as to close the generator circuit, through contacts 39 and 40, and current generated by the magneto-generator is supplied through the circuit wire 35 to the magnet 17 on the immediate and the adjacent cars of the train.

Upon energization of magnet 17, the valve 18 is opened, venting fluid from the outer face of valve 19, so that the fluid pressure on the inner face thereof operates the valve to open communication from valve chamber 7 and the auxiliary reservoir 9 to the piston chamber 14 of the quick action piston 13.

The piston 13 is thereupon actuated to open the vent valve 15 and vent fluid from the brake pipe, so as to produce quick serial action throughout the train.

While the current generated by any one magneto-generator may not be sufficient to cause electric action throughout the train, especially on a long train, it will be evident that the cumulative effect of the magneto-generators on adjacent cars going into action will rapidly increase the sphere of influence, so that the emergency impulse will be propagated very rapidly throughout the train.

The object of normally holding the local circuit of each generator open until the generator armature has attained a predetermined speed, is to prevent loss of current from the train wire through a local circuit, in case the corresponding magneto-generator should happen to be out of commission, or not operating at that time.

Having now described my invention, what I claim as new and desire to secure by Letters Patent is:—

1. In an electro-pneumatic brake, the combination with a brake pipe, means operated upon a sudden reduction in brake pipe pressure for venting fluid from the brake pipe, and an electrically controlled device for effecting a reduction in brake pipe pressure, of an electric generator for supplying current to said electrically controlled device, and a motor operated by fluid vented from the brake pipe for operating said generator.

2. In an electro-pneumatic brake, the combination with a brake pipe and an electrically controlled device for effecting a local reduction in brake pipe pressure, of a magneto-generator for supplying current to said device and a turbine wheel operated by fluid pressure supplied in effecting an emergency application of the brakes for operating said generator.

3. In an electro-pneumatic brake, the combination with a brake pipe and an electrically controlled device for effecting a local reduction in brake pipe pressure, of a magneto-generator for supplying current to said device, a fluid operated motor for operating said generator, and means operated at a predetermined generator speed for connecting said generator into circuit with said device.

4. In an electro-pneumatic brake, the combination with a brake pipe, a quick action valve mechanism, and an electrically controlled device for effecting the operation of said mechanism, of a vent valve device operated upon a sudden reduction in brake pipe pressure for venting fluid from the brake pipe, an electric generator for supplying current to said electrically controlled device, and a fluid motor operated by fluid vented from the brake pipe by the operation of said vent valve device for operating said generator.

In testimony whereof I have hereunto set my hand.

WALTER V. TURNER.